United States Patent [19]
Krasnov et al.

[11] Patent Number: 4,830,121
[45] Date of Patent: May 16, 1989

[54] BREAK-OUT JOINT WITH SELECTIVE DISABLER

[75] Inventors: Igor Krasnov; John K. Moses, both of Houston, Tex.

[73] Assignee: Vetco Gray Inc., Houston, Tex.

[21] Appl. No.: 193,425

[22] Filed: May 12, 1988

[51] Int. Cl.⁴ ...................... E21B 17/043; E21B 19/16
[52] U.S. Cl. ...................................... 175/57; 175/320; 166/77.5; 403/320; 285/81; 285/89
[58] Field of Search .......................... 175/320, 256, 57; 166/242, 377, 379, 77.5; 403/320; 285/81, 89, 92, 333

[56] References Cited

U.S. PATENT DOCUMENTS

| 2,708,132 | 5/1955 | O'Neill | 285/81 |
| 3,608,933 | 9/1971 | Lee | 403/320 |
| 3,915,244 | 10/1975 | Brown | 175/85 |
| 4,252,458 | 2/1981 | Keen | 403/320 |
| 4,534,585 | 8/1985 | Saliger | 285/89 |
| 4,606,557 | 8/1986 | Coffey | 285/81 |
| 4,658,915 | 4/1987 | Goris et al. | 175/57 |

Primary Examiner—Stephen J. Novosad
Assistant Examiner—Terry Lee Melius
Attorney, Agent, or Firm—James E. Bradley

[57] ABSTRACT

A device for reducing the break-out torque in a drill pipe tool joint selectively can be disabled so that break-out is at standard torque. The torque reducing device includes a collar located on the pin. The collar has a makeup shoulder that makes up against the makeup shoulder of the box of the drill pipe. The collar has a pair of ramp rings that will slide relative to each other during break-out torque. When they slide, they reduce the overall vertical height, allowing the collar to move vertically from the makeup shoulder a slight distance to reduce the torque. A split ring encircles the ramp rings for urging the ramp rings back to the initial position. A pin engages a slot in the split ring. The pin can be rotated between locked and unlocked positions to prevent the split ring from expanding. This prevents the ramp rings from operating.

4 Claims, 3 Drawing Sheets

BREAK-OUT JOINT WITH SELECTIVE DISABLER

BACKGROUND OF THE INVENTION

1. Field of the Invention:

This invention relates in general to the drill string of a rotary drilling rig, and in particular to a mechanism for reducing the torque required to break-out a joint.

2. Description of the Prior Art:

In U.S. Pat. No. 4,658,915, Apr. 21, 1987, Gregg A. Goris, et al, a reduced torque break-out assembly is shown. The assembly has an upper sub with a collar located around pin threads. The box end of a joint of drill pipe secures to the pin threads and the upper edge or shoulder on the box engages a shoulder on the collar. These shoulders make up to a high torque because of the friction between the shoulders.

A pair of ramp rings are located between the collar and the upper sub. The ramp rings have mating upper and lower inclined surfaces. One of the ramp rings is fixed to the upper sub to rotate with it. The other ramp ring is fixed to the collar to rotate with it. When left hand torque is applied, the upper ring will slide slightly along the inclined ramp surfaces relative to the lower ring. This allows the collar to move axially a slight distance up the upper sub. This reduces the friction between the mating shoulders of the collar and the box end of the drill pipe. A split ring extending around the ramp rings expands during the ramping motion, then contracts to reset the rings.

While this assembly is satisfactory, occasions exist in which one may not wish to allow the assembly to break-out at the reduced torque. For example, in the case of drilling with a high potential of drill string backlash, the backlash could accidentally cause the assembly to loosen due to the reduced torque.

SUMMARY OF THE INVENTION

In this invention, the same type of apparatus is employed for reducing the torque for break-out. However, a locking means is used that will selectively lock the system so that the assembly will break-out only at the standard torque, not at a reduced torque. This locking means can be moved between locked and unlocked positions by the drilling rig personnel.

The locking means includes a slot formed in the reset split ring. A pin is rotatably mounted to the collar, with its head inserted into the slot in the split ring. The head of the pin has a major dimension when measured in one direction, and a lesser dimension when rotated 180 degrees. When rotated to its locked position, the pin head fills essentially the entire width of the slot in the split ring. Consequently, the split ring cannot expand. This stops the ramp rings from ramping, and prevents the reduced torque apparatus from working. Rotating the pin 180 degrees moves it to an unlocked position. In that case, the head is substantially less than the width of the slot in the split ring. The split ring is free to expand as the rings ramp. The reduced torque mechanism is free to operate.

DESCRIPTION OF THE PREFERRED EMBODIMENT

Figure 1:
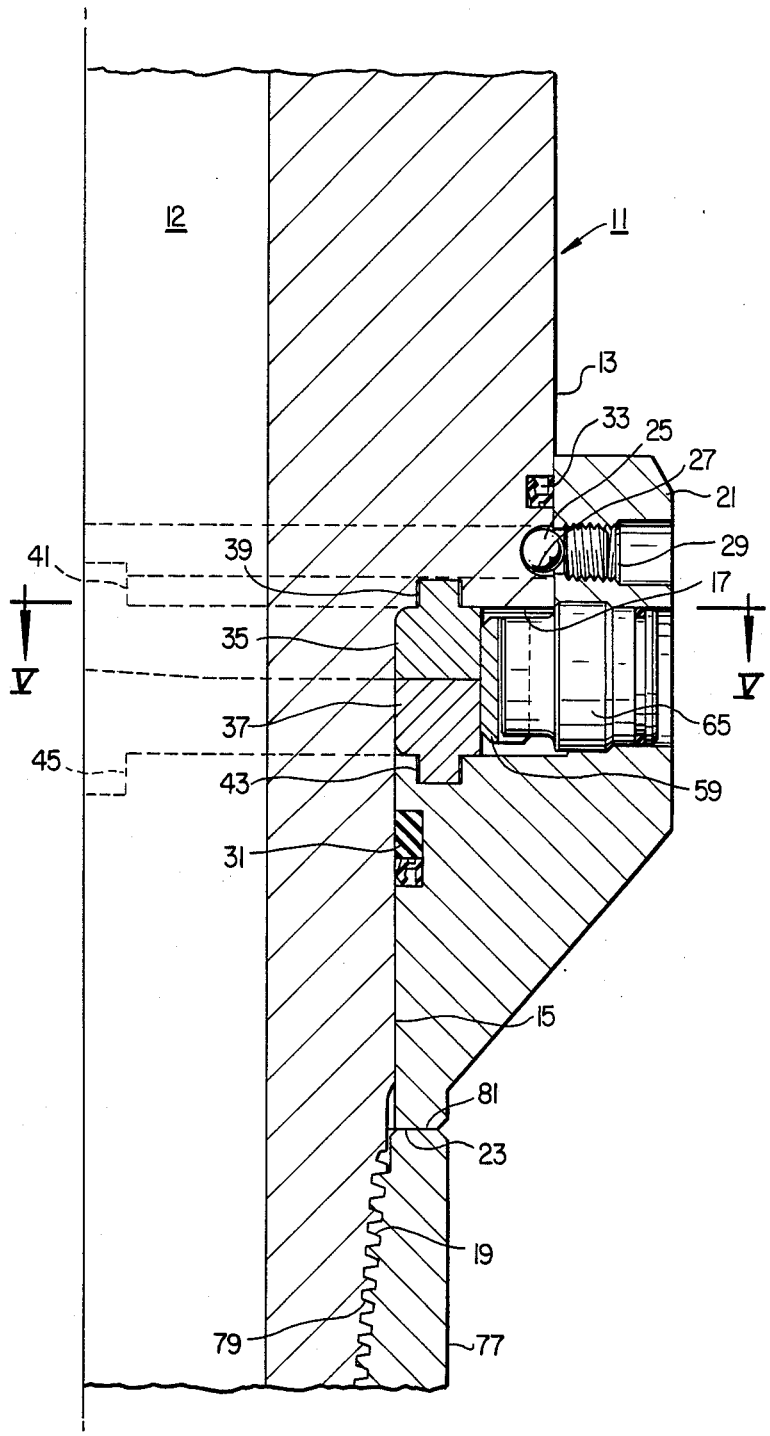
FIG. 1 is a vertical sectional view illustrating a break-out sub constructed in accordance with this invention.

Referring to FIG. 1, an upper sub 11 is shown. The upper sub 11 will be normally connected to the drive stem of a top drive drill rig (not shown). Upper sub 11 has a bore 12 extending through it for the passage of drilling fluid. Upper sub 11 has an upper cylindrical portion 13 and a lower cylindrical portion 15. The lower cylindrical portion 15 is of smaller diameter, resulting in a downward facing shoulder 17. A plurality of threads 19 are formed on the lower end of the upper sub 11. Threads 19 form a pin connection with a conical taper.

A collar 21 is mounted to the upper sub 11. Collar 21 has an upper cylindrical bore which engages the upper cylindrical portion 13. Collar 21 has a lower cylindrical bore which engages the upper sub lower cylindrical portion 15. Seals 31, 33 provide sealing between the upper sub 11 and the collar 21. Collar 21 has on its lower end a shoulder 23 that faces downward.

Collar 21 is held on the upper sub 11 by a plurality of balls 25 located in a groove 27. The balls 25 are held by a plug 29. The balls 25 will retain the collar 21, but allow a slight axial movement of the collar 21 relative to the upper sub 11.

An upper ramp ring 35 and a lower ramp ring 37 are mounted between the upper sub shoulder 17 and the collar 21. The upper ramp ring 35 has a lug 39 that fits within a rectangular recess 41 in the shoulder 17 of the upper sub 11. This locks the upper ramp ring 35 to the upper sub 11 for rotary movement therewith.

Similarly, the lower ramp ring 37 has a lug 43 on its lower side that engages a rectangular recess 45 formed in the collar 21. Lug 43 causes the lower ramp ring 37 to rotate in unison with the collar 21.

Figure 2:
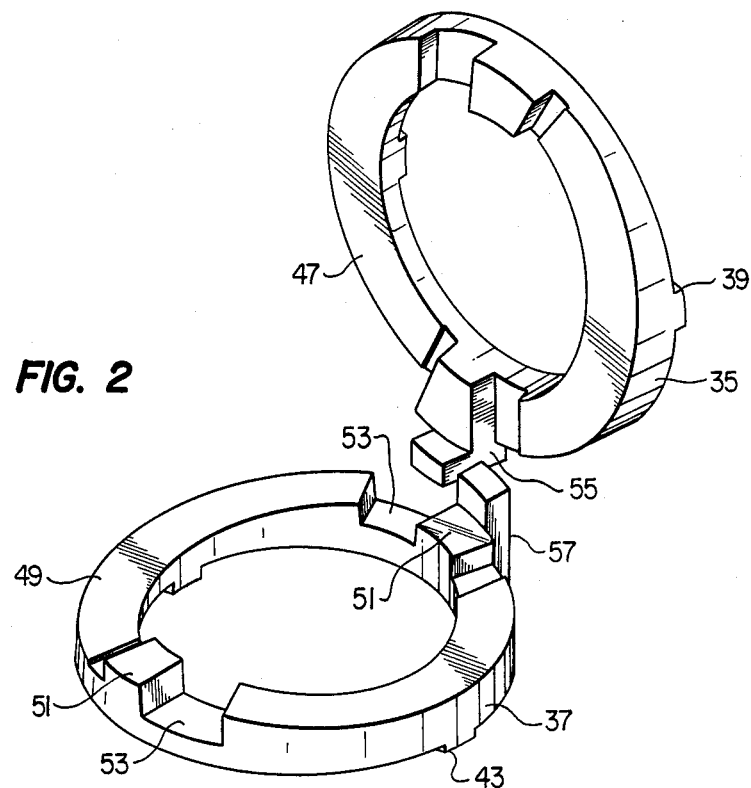
FIG. 2 is a perspective view illustrating the ramp rings for the break-out sub of FIG. 1.
Figure 3:
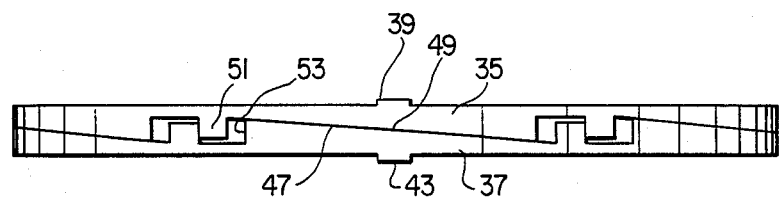
FIG. 3 is a side projection or layout view of the ramp rings of FIG. 2, showing the rings in the reset position.
Figure 4:
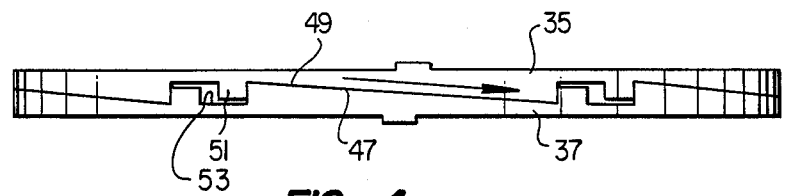
FIG. 4 is a projected view of the ramp rings of FIG. 2, showing the rings in a position in which they exist when break-out torque is applied.

Referring to FIGS. 2–4, the upper ramp ring 35 has a pair of lower inclined or helical surfaces 47. The lower ramp ring 37 has on its upper side a pair of mating inclined surfaces 49. A stop member 51 protrudes from each inclined surface 47, 49. Each stop member 51 is surrounded on both sides by a recess 53. As shown in FIGS. 3 and 4, the stop members 51 extend into the recess 53 of the mating ramp rings 35, 37.

In the reset position, shown in FIG. 3, the stop members 51, 53 are in contact with each other. When break-out torque is applied, the upper ramp ring 35 will rotate slightly relative to the lower ramp ring 37, sliding down the ramp surfaces 47, 49, as can be seen by comparing FIGS. 3 and 4. This reduces the overall vertical thickness of the assembled ramp rings 35, 37. This allows the collar 21 (FIG. 1) to move upward slightly on upper sub 11 to reduce friction.

The ramp rings 35, 37 have a resetting means for causing them to move back to the reset position shown in FIG. 3. As shown in FIG. 2, the resetting means includes a pair of reset lugs 55, 57. These reset lugs 55, 57 extend radially outward from the outer diameters of the ramp rings 35, 37. When in the reset position, shown in FIG. 3, the lugs 55, 57 will contact one another, as shown in FIG. 5.

Figure 5:
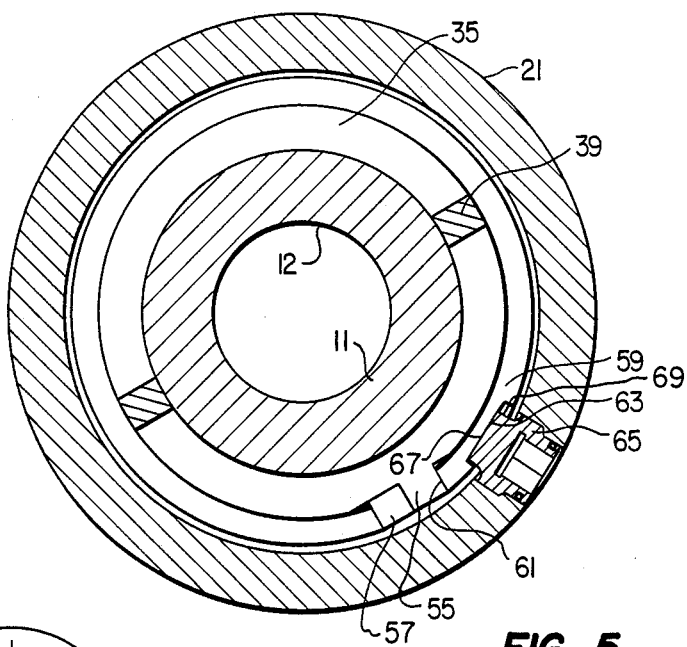
FIG. 5 is a sectional view of the sub of FIG. 1, taken along the line V—V of FIG. 1.

Referring to FIG. 5, lugs 55, 57 locate within the split 61 of a split ring or C-ring 59. When the upper ramp ring 35 rotates relative to the lower ramp ring 37 (FIG. 4), the reset lug 55 will move slightly in a circumferential direction from the reset lug 57. This causes the split 61 of the split ring 59 to increase in dimension, causing the split ring 59 to expand. The resiliency in the split ring 59 urges the reset lugs 55, 57 back to the reset position overlying one another, as shown in FIG. 5. The ramp rings 35, 37 return to the reset position shown in FIG. 3.

Figure 6:
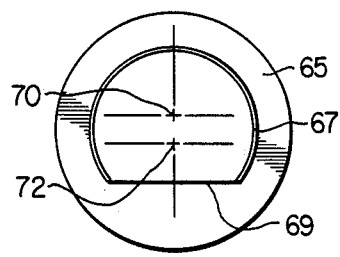
FIG. 6 is an end view of a lock pin used with the sub of FIG. 1.
Figure 7:
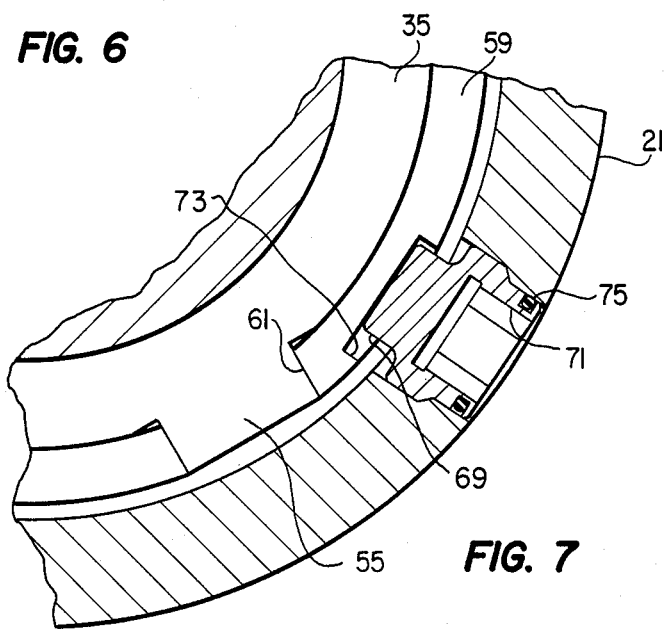
FIG. 7 is a partial enlarged view of the lock pin of FIG. 6, but showing the lock pin in an unlocked position.

A locking means, shown in FIGS. 5, 6 and 7, is used to selectively prevent the ramp rings 35, 37 from sliding relative to one another. The locking means includes a rectangular slot 63 formed in the split ring 59. A pin 65 extends radially through a hole in the collar 21 into engagement with the split ring 59. Pin 65 has a cylindrical body from which a head 67 protrudes that fits within the slot 63.

As shown in FIG. 6, head 67 is a cam surface. The centerline 70 of the head 67 is offset from the centerline 72 of the body of pin 65. The head 67 of pin 65 is cylindrical except for a truncated or flat side 69.

A socket 71 is formed in the pin 65. The socket 71 is accessible from the exterior of the sub 11 (FIG. 1). Socket 71 allows one to use a wrench to rotate the pin 65 180 degrees from the locked position shown in FIG. 5 to the unlocked position shown in FIG. 7. A seal 75 provides sealing for the pin 65.

In the locked position shown in FIG. 5, a substantial clearance 73 exists between the flat side 69 of head 67 and the edge of slot 63 farthest from the split 61. The offset centerline 70 of the head 67 causes the cylindrical surface of head 67 to act as a cam and bear tightly against the edge of slot 63 closest to the split 61. This prevents the split ring 59 from expanding. The lugs 55, 57 can not separate and the ramp rings 35, 37 can not ramp.

When rotated 180 degrees to the unlocked position shown in FIG. 7, a substantial clearance 73 exists between flat side 69 of head 67 and the edge of slot 63 nearest the split 61. The cylindrical portion of head 67 will contact the edge of slot 63 farthest from split 61. Clearance 73 when on the side nearest split 61, allows the split ring 59 to expand when break-out torque is applied. The lugs 55, 57 can separate and the ramp rings 35, 37 can ramp.

Referring again to FIG. 1, a section of a drill pipe 77 is shown. The section has box threads 79 for engaging the pin threads 19. An upward facing rim or shoulder 81 is located on the upper end for engaging the shoulder 23 of the collar 21.

In operation, the upper sub 11 will be connected to a power driven drive stem (not shown). The drill pipe 77 will be connected to the pin threads 19. During make-up, the shoulder 23 of collar 21 will bear tightly against the shoulder 81 of the drill pipe 77. The friction between the shoulders 81 and 23 will apply torque during drilling from the sub 11 to the drill pipe 77.

If one wishes the apparatus to provide a reduced torque for break-out, the pin 65 (FIG. 7) is rotated to the unlocked position shown in FIG. 7. Referring again to FIG. 1, left hand torque will rotate the upper ramp ring 35 a slight distance relative to the lower ramp ring 37. The tight contact of the shoulders 81 and 23 initially will prevent the collar 21 from rotating relative to the drill pipe box 77. The upper ramp ring 35 will slide relative to the lower ramp ring 37 a slight distance until each stop member 51 contacts an edge of a recess 53. The amount of rotation is only about two degrees and the circumferential distance of travel is only about 0.080 inch. This decreases the overall vertical thickness, as shown in FIG. 4 of the assembled ramp rings 35, 37. The friction between the shoulders 81 and 23 decreases, reducing the torque required to break-out the threaded sections 19, 79.

The lugs 55, 57 (FIG. 2) will move apart relative to each other as the upper ramp 35 slides relative to the lower ramp ring 37. This casues the split 61 (FIG. 7) of the split ring 59 to expand. The resiliency of the split ring 59 will push the reset lugs 55, 57 (FIG. 2) back together to reset the ramp rings 35, 37 once the shoulders 23, 81 (FIG. 1) have separated from each other.

If it is desired to prevent the torque reducing means from operating, a worker will insert a wrench into the socket 71 (FIGS. 5 and 7) to rotae the pin head 67 180 degrees to the position shown in FIG. 5. This locks the split ring 59. The lugs 55, 57 will not be able to move relative to each other. This prevents the ramp rings 35, 37 (FIG. 2) from ramping relative to each other.

The invention has significant advantages. The device will serve as a torque reducing means for reducing the torque required to break-out the joint. It can be easily converted to a joint that breaks out at the standard torque.

While the invention has been shown in only one of its forms, it should be apparent to those skilled in the art that it is not so limited, but is susceptible to various changes without departing from the scope of the invention.

We claim:

1. A tool joint, comprising in combination:
an upper tubular member having external threads;
a collar mounted to the tubular member above the external threads, the collar having a downward facing shoulder;
a lower tubular member having internal threads for receiving the external threads of the upper tubular member and an upward facing shoulder for engagement with the shoulder on the collar to make up said tool joint;
upper and lower rings located between the upper tubular member and the collar, one of the rings being mounted for rotation with the collar and the other of the rings being mounted for rotation with the upper tubular member, the rings having mating inclined ramp means for causing one of the rings to slide relative to the other for decreasing the vertical thickness of the rings when rotating the upper tubular member relative to the collar in a break-out direction, to cause the shoulder on the collar to move upward relative to the shoulder on the lower tubular member to reduce the amount of break-out torque required; and
lock means mounted to the collar and selectively movable between a locked position for preventing the rings from rotating relative to each other and an unlocked position allowing the rings to rotate relative to each other.

2. A tool joint, comprising in combination:
an upper tubular member having external threads;

a collar mounted to the tubular member above the external threads, the collar having a downward facing shoulder;

a lower tubular member having internal threads for receiving the external threads of the upper tubular member and an upward facing shoulder for engagement with the shoulder on the collar to make up said tool joint;

a pair of ramp rings located between the upper tubular member and the collar, one of the ramp rings being mounted for rotation with the collar and the other of the ramp rings being mounted for rotation with the upper tubular member, the ramp rings having mating inclined ramp means for causing one of the ramp rings to slide relative to the other for decreasing the vertical thickness of the ramp rings when rotating the upper tubular member in a break-out direction, to cause the shoulder on the collar to move upward slightly relative to the shoulder on the lower tubular member to reduce the amount of break-out torque required;

a split ring;

means engaging the split ring with the ramp rings to cause the split ring to expand when one of the ramp rings rotates relative to the other ramp ring in a break-out direction and for urging the ramp rings to rotate back in the opposite direction to reset;

lock means mounted to the collar for preventing the split ring from expanding and thus preventing the ramp rings from rotating relative to each other, the lock means being movable to an unlocked position allowing the split ring to expand and the ramp rings to rotate relative to each other.

3. A tool joint, comprising in combination:

an upper tubular member having external threads;

a collar mounted to the tubular member above the external threads, the collar having a downward facing shoulder;

a lower tubular member having internal threads for receiving the external threads of the upper tubular member and an upward facing shoulder for engagement with the shoulder on the collar to make up said tool joint;

upper and lower ramp rings located between the upper tubular member and the collar, the lower ramp ring being mounted for rotation with the collar and the upper ramp ring being mounted for rotation with the upper tubular member, the ramp rings having mating inclined ramp means for sliding on one another and decreasing the vertical distance from the lower side of the lower ramp ring to the upper side of the upper ramp ring when rotating the upper tubular member in a break-out direction, to cause the shoulder on the collar to move upward slightly relative to the shoulder on the lower tubular member to reduce the amount of break-out torque required;

a split ring;

means engaging the split ring with the ramp rings to cause the split ring to expand when one of the ramp rings rotates relative to the other ramp ring in a break-out direction and for urging the ramp rings to rotate back in the opposite direction to reset; and lock means mounted to the collar in engagement with the split ring and accessible from the exterior for selectively preventing the split ring from expanding and thus preventing the ramp rings from rotating relative to each other, the lock means comprising a pin that engages a slot in the split ring.

4. A tool joint, comprising in combination:

an upper tubular member having external threads;

a collar mounted to the tubular member above the external threads, the collar having a downward facing shoulder;

a lower tubular member having internal threads for receiving the external threads of the upper tubular member and an upward facing shoulder for engagement with the shoulder on the collar to make up said tool joint;

a pair of ramp rings located between the upper tubular member and the collar, one of the ramp rings being mounted for rotation with the collar and the other of the ramp rings being mounted for rotation with the upper tubular member, the ramp rings having mating inclined ramp means for decreasing the vertical thickness of the ramp rings when rotating the upper tubular member and one of the ramp rings a slight amount relative to the collar and the other ramp ring in a break-out direction, to cause the shoulder on the collar to move upward slightly relative to the shoulder on the lower tubular member to reduce the amount of break-out torque required;

a split ring having a split formed therein;

means engaging the split ring with the ramp rings to cause the split ring to expand when one of the ramp rings rotates relative to the other ramp ring in a break-out direction and for urging the ramp rings to rotate back in the opposite direction to reset;

a pin having a cylindrical body rotatably mounted to the collar and having a head protruding inward from the collar into engagement with a slot formed in the split ring, the head having a centerline that is offset from a centerline of the body of the pin, whereby the pin may be positioned in a locked position to engage an edge of the slot nearest the split to prevent the split ring from expanding and thus the rings from rotating, the pin being rotatable substantially 180 degrees to an unlocked position which provides a clearance between said nearest edge of the slot and the head to allow the split ring to expand.

* * * * *